United States Patent [19]

Johnson

[11] 4,091,314

[45] May 23, 1978

[54] CIRCUIT APPARATUS FOR ENABLING USE OF AN A-C TACHOMETER AS THE SPEED SIGNAL FROM A BI-DIRECTIONAL D-C MACHINE

[75] Inventor: Chandler A. Johnson, Sussex, Wis.

[73] Assignee: General Electric Company, Erie, Pa.

[21] Appl. No.: 726,566

[22] Filed: Sep. 27, 1976

[51] Int. Cl.² .............................................. H02P 7/00
[52] U.S. Cl. ................................... 318/464; 318/326; 318/327; 318/328; 318/331; 324/165
[58] Field of Search ............... 318/326, 327, 328, 331, 318/463, 464; 324/165

[56] References Cited

U.S. PATENT DOCUMENTS

| 3,614,616 | 10/1971 | Bucek et al. | 324/165 |
| 3,665,274 | 5/1972 | Born et al. | 318/331 |
| 3,882,402 | 5/1975 | Jensen | 324/165 |
| 3,969,677 | 7/1976 | Woyton | 324/165 |

FOREIGN PATENT DOCUMENTS

| 248,356 | 5/1970 | U.S.S.R. | 324/165 |

OTHER PUBLICATIONS

Henry et al., "Motor Tachometer Circuit," IBM Technical Disclosure Bulletin, 12/71, pp. 1986–1987.

Primary Examiner—Robert K. Schaefer
Assistant Examiner—Eugene S. Indyk
Attorney, Agent, or Firm—Arnold E. Renner

[57] ABSTRACT

Circuit apparatus for providing a signal indicative of speed and direction of rotation of a d-c machine is provided which utilizes an a-c tachometer output as the speed signal from the bi-directional d-c machine. The circuit apparatus includes means responsive to the armature terminal voltage and armature current to provide a signal proportional to the counter electromotive force generated in the armature. Polarity circuit means responsive to nulls in the armature current and the signal proportional to the counter electromotive force generates a signal which is a function of the polarity of the counter electromotive force. An absolute value circuit means is provided for receiving the output of an a-c tachometer driven by the d-c machine. The absolute value circuit means includes switch means responsive to the polarity signal for generating an output signal having an absolute value proportional to the output of the tachometer and the speed of the d-c machine and a polarity which is a function of the direction of rotation of the d-c machine.

17 Claims, 1 Drawing Figure

CIRCUIT APPARATUS FOR ENABLING USE OF AN A-C TACHOMETER AS THE SPEED SIGNAL FROM A BI-DIRECTIONAL D-C MACHINE

BACKGROUND OF THE INVENTION

The present invention relates to an apparatus for enabling the use of an a-c tachometer output as the speed signal from a bi-directional d-c machine. More particularly, the present invention relates to a means for providing a d-c signal output which has an absolute value proportional to the speed of a bi-directional d-c machine and a polarity indicative of the direction of rotation of the bi-directional d-c machine and which utilizes an a-c tachometer output as the input speed signal.

In the past, the most common means of determining the speed of a motor was to use a d-c tachometer connected to the shaft of the d-c machine. The d-c tachometer is typically a permanent magnet generator which provides an output which is proportional to the speed of rotation and the polarity of which is a function of the direction of rotation. However, the d-c tachometer has several disadvantages. One of these disadvantages is that the output voltage for a predetermined speed of rotation is slightly different between the forward and reverse directions of rotation. Another disadvantage is that the d-c tachometer requies brushes which are subject to wear and which require periodic maintenance. An even more serious disadvantage is that explosion proof designs are difficult to achieve and expensive due to the need to protect against the possibility of arcing at the comutator's surface. These problems are not present when an a-c tachometer is used as the speed signal source. The a-c tachometer provides an output a-c voltage which is proportional to the speed of rotation. However, when using an a-c tachometer alone, the direction of rotation of the machine is not known.

The present invention overcomes these disadvantages by enabling the use of an a-c tachometer as the speed signal from a bidirectional machine by providing a means of converting the a-c output of the tachometer to a d-c signal having an absolute value proportional to the speed of the machine and a polarity which is a function of the direction of rotation of the machine.

SUMMARY OF THE INVENTION

The polarity of the counter electromotive force generated by a d-c motor is a direct function of the polarity of the field excitation and the direction of rotation. For a unidirectional field source, the polarity of counter electromotive force is a true indication of the direction of rotation. However, the terminal voltage of a d-c motor equals the counter electromotive force only when no current is flowing in the armature. In accordance with the present invention, circuit means is provided to produce a signal proportional to the real or true counter electromotive force by using the armature voltage and armature current. It is well known in the art that:

CEMFT = V − IRa (1 + TaS), where:

CEMFT is the true counter electromotive force, V is the armature terminal voltage, I is the armature current, Ra is the armature resistance, Ta is the ratio of armature inductance to armature resistance, and S is the Laplace transform operator. This equation may be solved for CEMFT/(1 + TaS) by dividing both sides of the equation by quantity (1 + TaS). This results in the equation:

CEMFT/(1 + TaS) = V/(1 + TaS) − Ira.

The quantity CEMFT/(1 + TaS) is a quantity which is proportional to the true counter electromotive force generated in the armature of the bi-directional d-c machine. A circuit is disclosed herein for synthesizing or providing this signal which is proportional to the counter electromotive force generated in the armature of the bi-directional d-c machine. This signal is identified hereinafter as CEMF. The polarity of this signal may be used as an indication of the direction of rotation of the bi-directional d-c machine. However, other secondary currents affect and distort the generated counter electromotive force signal CEMF, such as armature reaction. The polarity of the counter electromotive force signal CEMF will always correspond to the polarity of the counter electromotive force in the armature of the motor during the time that the armature current of the d-c machine is zero, and will usually correspond at all other times. Therefore, a polarity circuit is provided which is responsive to the generated counter electromotive force signal CEMF and the armature current. The polarity circuit provides maximum sensitivity to the counter electromotive force signal when the armature current is at or near zero. Due to the selective sensitivity of the polarity circuit, the polarity signal output of the polarity circuit always corresponds to the direction of rotation of the bi-directional d-c machine.

Briefly and basically, in accordance with the present invention, circuit apparatus for providing a signal indicative of speed and direction of rotation is provided. The circuit apparatus uses an a-c tachometer output as the speed signal for a bi-directional d-c machine. The circuit apparatus includes circuit means responsive to armature terminal voltage and armature current to provide a signal proportional to the counter electromotive force generated in the armature of the bi-directional d-c machine. The circuit apparatus also includes polarity circuit means responsive to armature current and the signal proportional to the counter electromotive force for generating a signal which is a function of the polarity of the counter electromotive force generated in the armature of the bi-directional d-c machine. The circuit apparatus further includes an absolute value circuit means for receiving the output of an a-c tachometer driven by the bi-directional d-c machine. The absolute value circuit means is responsive to the polarity signal for generating an output signal having an absolute value proportional to the output of the a-c tachometer and the speed of the d-c machine, and a polarity which is a function of the direction of rotation of the d-c machine.

BRIEF DESCRIPTION OF THE DRAWING

For the purpose of illustrating the invention, there is shown in the drawing a form which is presently preferred; it being understood, however, that this invention is not limited to the precise arrangements and instrumentalities shown.

DETAILED DESCRIPTION OF A PREFERRED EMBODIMENT

Figure 1:
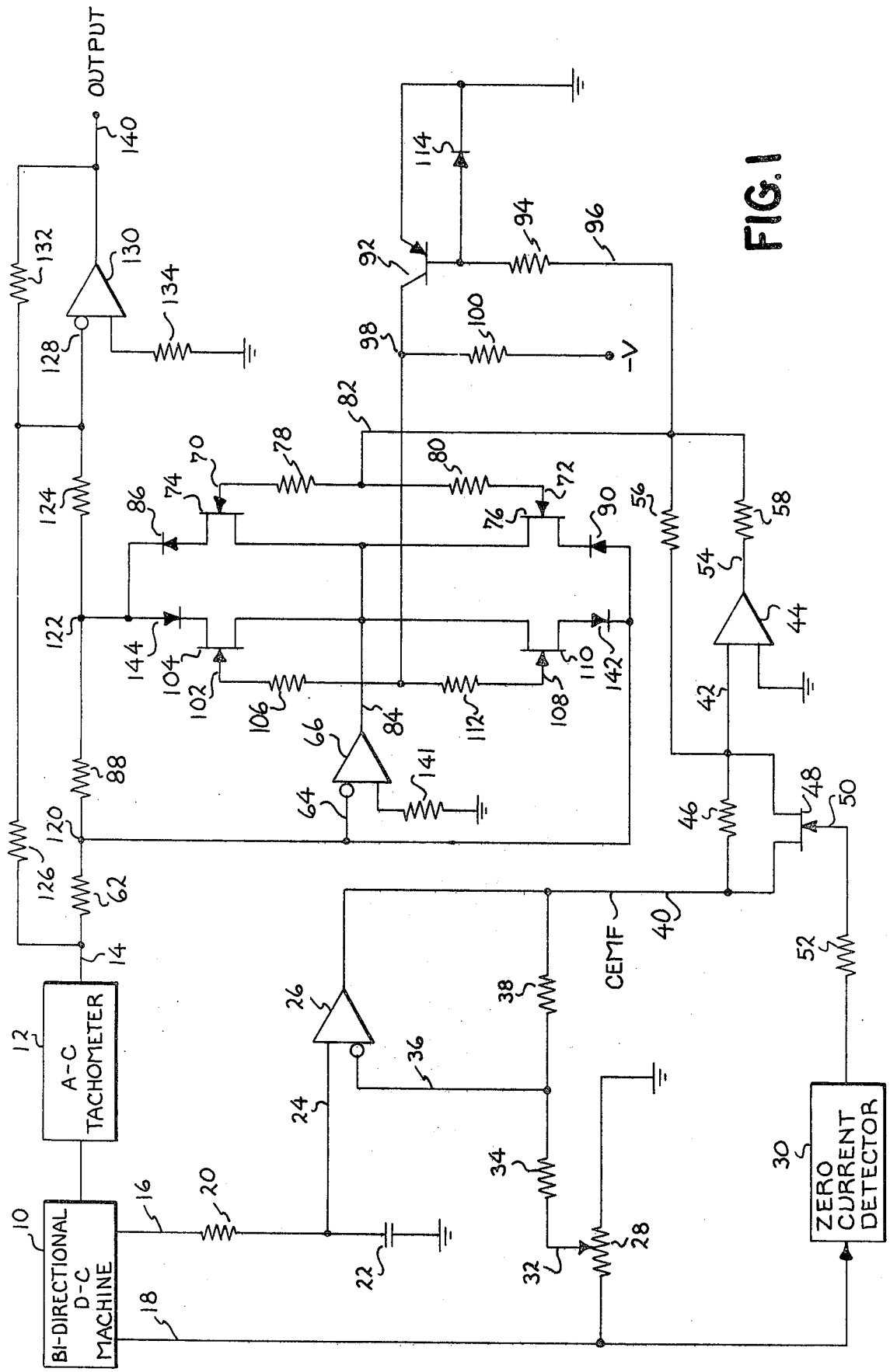
FIG. 1 is a schematic diagram of a circuit apparatus in accordance with the present invention.

Referring now the drawing, there is shown a bi-directional d-c machine 10 of which it is desired to have a signal representative of the speed and direction of rotation of the machine. This signal may be desirable for motor control, monitoring and other control purposes. An a-c tachometer 12 is physically coupled to the shaft of the bi-directional d-c machine 10. The a-c tachometer 12 provides an a-c signal on output line 14, the magnitude of which is proportional to the rotational speed of bi-directional d-c machine 10. A signal is obtained on line 16 from bi-directional machine 10 which is representative of the armature terminal voltage. A signal is obtained on line 18 from bi-directional d-c machine 10 which is representative of armature current.

The signal on line 16 representative of armature terminal voltage is fed to a resistor and capacitor network comprised of resistor 20 and capacitor 22 connected in series between the armature terminal and ground. The voltage at the junction between resistor 20 and the capacitor 22 is fed to non-inverting input 24 of operational amplifier 26. The voltage on input 24 is equal to $V/(1 + R20C22S)$ with R20 being equal to the resistance of resistor 20 and C22 being equal to the capacitance of capacitor 22. S is the Laplace transform operator. The product of R20 and C22 is selected to be equal to the value Ta which is the ratio of armature inductance to armature resistance, the time constant of the armature. The value Ta was discussed above. It is therefore seen that the voltage input on input 24 of operational amplifier 26 is equal to $V/(1 + TaS)$. Operational amplifier 26 may be any suitable well known type of operational amplifier.

The signal on line 18, representative of armature current, is applied to potentiometer 28 and the input of zero current detector 30. The signal on line 18 is proportional to the armature current and is applied to potentiometer 28. The arm 32 of potentiometer 28 is adjusted so that the signal through resistor 34 is scaled to be equal to IRa which is the armature current multiplied by armature resistance. This signal is applied to inverting input 36 of operational amplifier 26 and is subtracted from the signal applied to the non-inverting input 24. The resultant output of operational amplifier 26 is a difference signal which is the synthesized signal CEMF, which is discussed above equals $CEMFT/(1 + TaS)$ which equals $V/(1 + TaS) - IRa$. Resistor 38 functions as a feedback resistor.

Zero current detector 30 detects armature current flow below a predetermined level or, in other words, armature current flow which is substantially zero. By way of example, but not by way of limitation, zero current detector 30 will produce a positive output signal when armature current is equal to or less than 5% of rated armature current. Zero current detector 30 can be any one of numerous zero current detector circuits well known to those skilled in the art. For example, the zero current detector circuit may be a comparator circuit in which the armature current is compared to a predetermined set level or which is compared to a selectable predetermined level. Means for generating a comparison level or threshold level are well known to those skilled in the art. For example, the comparison level can be generated by a voltage divider network comprised of resistors or of resistors and voltage breakdown devices, such as zener diodes.

Although the input to zero current detector 30 is shown as being derived directly from bi-directional d-c machine 10, it is understood that this input could be obtained from other circuitry used in connection with the bi-directional d-c machine 10. For example, the input to the zero current detector could be taken from a silicon control rectifier (SCR) controller providing the pulsating d-c armature voltage to bi-directional d-c machine 10. It is preferred that the circuit of the present invention be utilized with a bi-directional d-c machine supplied from a source of armature current which periodically goes to or approaches zero. In this manner, the accuracy of the output signal of the present invention may be maximized. This could become of importance where the bi-directional d-c machine 10 is operated at very low speeds, for example, two or three revolutions per minute.

The CEMF signal output of operational amplifier 26 is fed to a polarity circuit comprised of operational amplifier 44 and associated circuitry. The output on line 40 of operational amplifier 26 is supplied as an input to input 42 of operational amplifier 44 through either a resistor 46 or a field effect transistor 48. Field effect transistor 48 is turned on or placed in a conducting state by a positive output from zero current detector 30 applied to its gate 50 through resistor 52. The purpose of field effect transistor 48 is to short out resistor 46 to selectively increase the sensitivity of operational amplifier 44 to the CEMF signal generated by operational amplifier 26 when zero current detector 30 detects zero or substantially zero armature current flow. However, it is understood that various other suitable switching means can be used in place of field effect transistor 48 to short out resistor 46 during periods when armature current is detected to be substantially zero.

The polarity circuit comprised primarily of operational amplifier 44 and the associated circuitry operates as follows. Assuming that armature current is not substantially zero, the output of zero current detector 30 is negative causing field effect transistor 48 to be biased off or in a non-conducting state. Assuming that the output 54 of operational amplifier 44 is positive, current will flow from output 54 of operational amplifier 44 to output 40 of operational amplifier 26 through resistors 58, 56 and 46. If input 42 of operational amplifier 44 is positive, the output 54, which may be referred to as the polarity signal, is positive. If input 42 is negative, the polarity signal on output 54 is also negative. Therefore, the polarity signal will not switch unless the CEMF signal on line 40 from operational amplifier 26 is of the opposite polarity compared to the polarity of the polarity signal and of sufficient magnitude to change the polarity of input 42. In other words, the sensitivity of the polarity circuit is maximum when the zero current detector 30 detects zero or substantially zero armature current flow. The magnitude of the CEMF signal on line 40 necessary in order to cause a switching of the polarity signal on output 54 of operational amplifier 44 is equal to the magnitude of the polarity signal multiplied by the quantity (value of resistor 46 divided by the sum of the values of resistors 46 and 56), which may be expressed in formula form as: CEMF (switch) = (V(polarity signal)) R46/(R46 + R56).

When zero current detector 30 produces a positive output in response to the detection of zero or substantially zero armature current flow, this positive signal is applied to the gate of field effect transistor 48 turning on field effect transistor 48 and shorting out resistor 46. The shorting out of resistor 46 causes the signal CEMF from operational amplifier 26 to be applied directly to input 42 of operational amplifier 44. Therefore, the output of the polarity sensing circuit is directly controlled by the signal CEMF during periods of zero or minimal armature current flow. At other times, a predetermined degree of insensitivity is programmed into the polarity circuit thereby increasing the accuracy of the output of the polarity circuit.

The alternating current output of a-c tachometer 12 on output line 14 has a magnitude which is proportional to the speed of bi-directional d-c machine 10. This output is fed via resistor 62 to inverting input 64 of operational amplifier 66. Assuming rotation of bi-directional d-c machine 10 in a first direction which produces a positive polarity signal on the output 54 of operational amplifier 44, the application of this positive polarity signal to the gates 70 and 72 of field effect transistors 74 and 76, respectively, via resistors 78 and 80, respectively, causes field effect transistors 74 and 76 to be turned on or forced into a conducting state. This polarity signal is applied to the junction of resistor 78 and 80 via line 82. The turning on of field effect transistor 74 completes a feed back path between output 84 and input 64 of operational amplifier 66 when output 84 is positive via field effect transistor 74, diode 86 and resistor 88. Similarly, when output 84 of operational amplifier 66 is negative, a feedback path is completed, for a positive polarity signal, via field effect transistor 76 and diode 90.

The positive polarity signal on output 54 of operational amplifier 44 is also applied to the base of transistor 92 via resistor 94 and line 96. The positive polarity signal on the base of transistor 92 causes transistor 92 to be non-conducting thereby enabling point 98 to fall to the negative supply potential of −V through resistor 100. The negative supply voltage of −V may be, in practice, −20 volts. The potential at point 98 is applied to gate 102 of field effect transistor 104 via resistor 106 and to gate 108 of field effect transistor 110 via resistor 112. The application of the negative potential to the gates 102 and 108 keeps field effect transistors 104 and 110 turned off. Diode 114 in the emitter base circuit of transistor 92 protects the emitter base junction of transistor 92 from excessive positive potential thereby acting as a protective diode. It is understood that various switching devices well known in the art may be used in place of field effect transistors 74, 76, 104 and 110 and transistor 92.

With a positive polarity signal on output 54 of amplifier 44, field effect transistor 74 and 76 are turned on and field effect transistors 104 and 110 are turned off. Under these conditions, the following occurs on the positive half cycle of the output of a-c tachometer 12. The positive signal is applied through resistor 62 to the summing junction at point 120 and input 64 of operational amplifier 66. Since input 64 of operational amplifier 66 is an inverting input, the output signal on output 84 of operational amplifier 66 is negative. The negative output causes a negative feedback signal to be sent back to input terminal 64 via field effect transistor 76 and diode 90. The effect of the negative polarity feedback signal on the positive polarity input is that the summing junction at point 120 and input 64 of operational amplifier is maintained at a zero voltage level. Since input 64 and point 120 between resistor 62 and resistor 88 are at a zero voltage level, no current flows through resistor 88. Therefore, the voltage level at point 122, between resistors 88 and 124, is maintained at a zero level. This results in no current flowing through resistor 124. However, the positive voltage of output 14 of a-c tachometer 12 is applied through resistor 126 to inverting input 128 of operational amplifier 130. This results in a negative output potential on output 140 which is proportional to the positive half cycle of the output voltage of a-c tachometer 12. Resistor 132 is a feedback resistor on operational amplifier 130 and resistor 134 is a biasing resistor for operational amplifier 130. Resistor 141 is a biasing resistor for operational amplifier 66.

On the negative half cycle of the output of a-c tachometer 12, still assuming rotation of bi-directional d-c machine 10 in the first direction causing a positive polarity signal on output 54 of operational amplifier 44, the negative signal of the negative half cycle of the a-c tachometer output is applied to input 64 of operational amplifier 66. This signal causes a positive signal on output 84 of operational amplifier 66 and a positive polarity feedback signal being fed back to summing junction 120 and input 64 via field effect transistor 74, diode 86 and resistor 88. This feedback signal maintains the summing junction 120 and input 64 of operational amplifier 66 at a zero voltage level. The component values are chosen so that the voltage at junction 122 is proportional in magnitude, but opposite in polarity to the minus voltage output of a-c tachometer 12. The positive voltage at point 122 causes current flow through resistor 124 into the summing junction at input 128 of operational amplifier 130 and out through resistor 126 to the output 14 of a-c tachometer 12. The value of resistor 126 is selected so that the net current into the summing junction of operational amplifier 130 is equal to the current which would flow if the a-c input were positive. The net result is that the output on 140 will be negative and proportional to the value of the a-c output of a-c tachometer 12. In other words, for a positive polarity signal on output 54 of operational amplifier 44, indicating rotation of the armature of bi-directional d-c machine 10 in a first direction, the output signal on output 140 of operational amplifier 130 is a negative signal for both the positive and negative half cycles of the output of a-c tachometer 12, the magnitude of which is proportional to the magnitude of the output of a-c tachometer 12. The negative polarity of the output signal on output 140 indicates one direction of rotation of bi-directional d-c machine 10. The components which affect the output voltage on output 140 are resistors 62, 88, 124, 126 and 132. Although numerous combinations of component values may be selected to satisfy the requirements of the present invention, a circuit has been built and tested to operate successfully using a value of 10,000 ohms for resistors 62, 88 and 124, a value of 20,000 ohms for resistor 126 and a value of 27,400 ohms for resistor 132.

With respect to the condition in which there is a positive polarity signal on the output of operational amplifier 44, the operation of the circuit with respect to the input of operational amplifier 130 may be explained in the following manner. Resistor 126 may be considered as a first input signal path to operational amplifier 130 and resistor 124 as a second input signal path with algebraic summing of the signals in these two input signal paths taking place at the input 128 of operational amplifier 130. When there is a positive half cycle input from a-c tachometer 12, there is no current flow through resistor 88 and the total input to operational amplifier 130 is applied through resistor 126 which is the first input signal path to operational amplifier 130. Resistor 126 has a value equal to twice the value of resistor 124 and the value of resistor 88 is the same as the value of resistor 62. Assuming that the positive half cycle output of a-c tachometer 12 is two volts positive, four volts peak to peak, a positive one volt signal would be applied to input 128 of operational amplifier 130 by reason of the selection of the resistance values.

On the negative half cycle of the a-c tachometer output, still assuming that the output of a-c tachometer is four volts peak to peak, the negative half cycle input would be minus two volts applied through resistor 62 to input 64 of operational amplifier 66. The positive output of operational amplifier 66 is applied to summing junction point 120 through diode 86 and resistor 88 causing summing junction point 120 and input 64 of operational amplifier 66 to be a zero volts. The current flow through resistor 88 results in point 122 being at a positive two volts. The negative two volt signal on output 14 of a-c tachometer 12 is applied to the input 128 through resistor 126, the first input signal path. The positive two volt signal selectively developed at point 122 is applied to input 128 of operational amplifier 130 through the resistor 124, the second input signal path. The algebraic summation of these signals produces a net result on input 128 which is a positive one volt signal due to the resistance value of resistor 126 being twice the resistance value of resistor 124. This results in an output signal on output 140 of operational amplifier 130 being a predetermined negative voltage which is equal for both the positive and negative half cycles.

The operation of the circuit is substantially similar for a negative polarity signal indicating rotation of bi-directional machine 10 in a second direction, that is, opposite to the first direction. The magnitude of the output on 140 is determined by the same components resulting in an output voltage having an absolute value exactly the same for a given speed independent of whether bi-directional d-c machine 10 is rotating in a first or a second direction. In other words, the magnitude of the output voltage is independent of the direction of rotation of d-c machine 10. This obviates the disadvantages of d-c tachometers in which there is a slightly different output between the forward and reverse directions for a given speed of rotation.

For a negative polarity signal on output 54 of operational amplifier 44, indicating a second direction of rotation, field effect transistors 74 and 76 are turned off by reason of the application of the negative signal to gates 70 and 72, respectively, via line 82. The negative polarity signal on the base of transistor 92 causes transistor 92 to be turned on. The turning on of transistor 92 causes point 98 to rise to ground potential. This ground or common voltage at point 98 is applied to gates 102 and 108 of field effect transistors 104 and 110, respectively, biasing them on or into conduction. With field effect transistors 104 and 110 biased on, a feedback path is completed for operational amplifier 66 via field effect transistor 110 and diode 142 for a positive output on output 84 and via field effect transistor 104, diode 144 and resistor 88 for a negative signal on output 84.

Under this condition of a negative polarity signal, for the positive half cycle of the output of a-c tachometer 12, a positive signal is applied to input 64 of operational amplifier 66. This forces the output 84 of operational amplifier 66 to go negative resulting in the negative output signal being fed back to summing junction 120 via field effect transistor 104, diode 144 and resistor 88. This again results in a zero potential at point 120 and a negative potential at point 122 which is equal in magnitude to the output of a-c tachometer 12 but of opposite polarity. This negative signal at point 122 is applied to input 128 of operational amplifier 130 via resistor 124.

The positive half cycle of the output of a-c tachometer 12 is also applied to input 128 via resistor 126. However, resistor 126 is twice the value of resistor 124. The net result is a negative signal to operational amplifier 130 resulting in a positive output signal on output 140.

For the negative half cycle of the output of a-c tachometer 12, the output of a-c tachometer 12 is applied to input 64 of operational amplifier 66 via resistor 62. This negative signal causes the output of operational amplifier 66 to go positive resulting in a positive feedback signal to summing junction 120 via field effect transistor 110 and diode 142. The net result is that the input 64 and summing junction point 120 are at zero volts. Since there is no current flow through resistor 88, point 122 is also maintained at zero potential. The negative half cycle of the output voltage of a-c tachometer 12 is therefore applied through resistor 126 to inverting input 128 of operational amplifier 130. Due to the selection of resistor values, as previously explained, the output of operational amplifier 130 is again a positive output which is equal to the positive output achieved on the positive half cycle of the output voltage of a-c tachometer 12.

It can, therefore, be seen that the output signal on output 140 is a pulsating direct current signal which has a magnitude proportional to the magnitude of the a-c output of a-c tachometer 12 and a polarity which is a function of the polarity signal. Since the a-c tachometer output has a magnitude which is proportional to the speed of rotation of bi-directional d-c machine 10, the absolute value or magnitude of the output signal is proportional to the speed of rotation of bi-directional d-c machine 10. Since the polarity signal has the polarity of the counter electromotive voltage generated in the armature of the bi-directional d-c machine 10, the polarity of the output signal on output 140 is indicative of the direction of rotation of bi-directional d-c machine 10.

In summary, with respect to the absolute value circuit means comprised of a first amplifier 66, a second amplifier 130, the switch means on the output of amplifier 66 and the related circuitry, the absolute value circuit produces a pulsating direct current signal on the output of amplifier 130 which is proportional to the magnitude of the a-c output of the a-c tachometer 12 and which has a polarity which is a function of the polarity signal. The switch means on the output of amplifier 66 is comprised of two sets of two unidirectional current switch means for controlling the feedback signal paths around amplifier 66. The two sets of unidirectional current switch means are inverse parallel connected switches from the output to the input of amplifier 66. One set of switch means is comprised of a first unidirectional current switch means comprised of field effect transistor 104 and diode 144 and a second unidirectional current switch means is comprised of field effect transistor 110 and diode 142. The second set of two unidirectional current switch means is comprised of a first unidirectional current switch means comprised of field effect transistor 74 and diode 86 and a second unidirectional current switch means comprised of field effect transistor 76 and diode 90. As described previously, the first set of unidirectional current switch means is enabled when the polarity signal is of a first polarity and the second set is enabled when the polarity signal is of the opposite polarity,. With one set of unidirectional current switch means enabled, conduction occurs through one of the unidirectional current switch means as determined by the polarity on the output of amplifier 66. For example, if the first set of unidirectional current switch means is enabled, and the output of amplifier 66 is negative, current will flow through field effect transistor 104 and diode 144 to develop a signal across resistive component 88. The signal developed across component 88 is applied to the input of second amplifier 130 via the second signal path comprised of resistor 124. When the output of first amplifier 66 goes positive, with the first set of unidirectional current switch means still in an enabled state, current will no longer flow through diode 144, but will flow through diode 142. Current flow through diode 142 does not develop a signal across component 88, and therefore, no signal is applied to the input of the second amplifier 130 via the second signal path through resistor 124. The second set of switch means operates in a similar manner when enabled, the polarity signal being of the opposite polarity.

The present invention can be embodied in other specific forms without departing from the spirit or essential attributes thereof, and, accordingly, reference should be made to the appended claims, rather than to the foregoing specification as indicating the scope of the invention.

I claim:

1. Circuit apparatus for providing a signal indicative of speed and direction of rotation of a bi-directional d-c machine utilizing an a-c tachometer output as the speed signal from said bi-directional d-c machine, comprising:
    circuit means responsive to armature terminal voltage and armature current of said d-c machine for providing a polarity signal indicative of the polarity of the counter electromotive force generated in the armature; and
    absolute value circuit means for receiving the output of the a-c tachometer driven by said bi-directional d-c machine, said absolute value circuit means being responsive to said polarity signal and generating an output signal having an absolute value proportional to the output of said a-c tachometer and the speed of said d-c machine and a polarity which is a function of the direction of rotation of said d-c machine.

2. Circuit apparatus in accordance with claim 1 wherein said circuit means responsive to armature terminal voltage and armature current for providing the polarity signal includes an amplifier provided with a non-inverting input and an inverting input, a series resistor and capacitor network, said armature terminal voltage being applied across said resistor and capacitor network with the voltage developed across said capacitor being supplied as an input to said non-inverting input of said amplifier, said inverting input receiving a signal proportional to armature current.

3. A circuit apparatus in accordance with claim 2 including a polarity circuit means for selectively adjusting the sensitivity of said polarity signal in response to the detection of predetermined levels of armature current.

4. A circuit apparatus in accordance with claim 3 in which said polarity circuit means provides maximum sensitivity to the signal indicative of the polarity of the counter electromotive force during periods of time when armature current is detected to be substantially zero.

5. A circuit apparatus in accordance with claim 3 including a zero current detector means, said zero current detector means adapted to receive a signal proportional to armature current and to produce a signal output to said polarity circuit means for selectively adjusting the sensitivity of said polarity circuit means to maximum when said armature current is substantially zero.

6. A circuit apparatus in accordance with claim 1 wherein said polarity signal is of a first polarity indicating a first direction of rotation of said d-c machine or of a second polarity indicating a second direction of rotation of said d-c machine, and said absolute value circuit means includes signal processing paths for the output of said a-c tachometer which produce an output signal having a predetermined absolute value for a predetermined value output of said a-c tachometer independent of said first and second polarity signals.

7. A circuit apparatus in accordance with claim 1 wherein said absolute value circuit means includes a first amplifier provided with an input and an output and a second amplifier provided with an input and an output; a first and second signal path for applying a signal to said input of said second amplifier, said first signal path applying a signal to said input of said second amplifier from said a-c tachometer, switch means responsive to said polarity signal and connected to the output of said first amplifier for selecting a signal feedback path which determines a signal value to be applied to said second signal path of said input of said second amplifier, means whereby said signals developed via said first and second paths are algebraically summed at the input of said second amplifier to produce a net signal input to said second amplifier, whereby said output of said absolute value circuit means is proportional to the output of said a-c tachometer and the speed of said d-c machine and whereby the polarity of the output of said absolute value circuit means is a function of the direction of rotation of said d-c machine.

8. Circuit apparatus for providing a signal indicative of speed and direction of rotation of a bi-directional d-c machine utilizing an a-c tachometer output as the speed signal from said bi-directional d-c machine, comprising:
    circuit means responsive to armature terminal voltage and armature current to provide a signal proportional to the counter electromotive force generated in the armature;
    polarity circuit means responsive to armature current and the signal proportional to the counter electromotive force for generating a polarity signal which is a function of the polarity of the counter electromotive force; and
    absolute value circuit means for receiving the output of the a-c tachometer driven by said bi-directional d-c machine, said absolute value circuit means including switch means responsive to said polarity signal for selecting signal feedback paths within said absolute value circuit means, said absolute value circuit means generating an output signal having an absolute value proportional to the output of said a-c tachometer and the speed of said d-c machine and a polarity which is a function of the direction of rotation of said d-c machine.

9. Circuit apparatus in accordance with claim 8 wherein said circuit means responsive to armature terminal voltage and armature current to provide a signal proportional to the counter electromotive force generated in the armature includes an amplifier provided with a non-inverting input and an inverting input, a series resistor and capacitor network, said armature terminal voltage being applied across said resistor and capacitor network with the voltage developed across said capacitor being supplied as an input to said non-inverting input of said amplifier, said inverting input receiving a signal proportional to armature current.

10. A circuit apparatus in accordance with claim 8 wherein said polarity circuit means includes means for selectively adjusting the sensitivity of said polarity circuit means in response to the detection of predetermined levels of armature current.

11. A circuit apparatus in accordance with claim 10 in which said means for selectively adjusting the sensitivity of said polarity circuit means includes a zero current detector for detecting substantially zero armature current, said zero current detector providing a zero current detector output signal to said polarity circuit means and means to cause said polarity circuit means to provide maximum sensitivity to the signal proportional to the counter electromotive force during periods of time when armature current is detected to be substantially zero.

12. A circuit apparatus in accordance with claim 8 wherein said polarity signal is of a first polarity indicating a first direction of rotation of said d-c machine or of a second polarity indicating a second direction of rotation of said d-c machine, and said absolute value circuit means includes signal processing paths for the output of said a-c tachometer which produce an output signal having a predetermined absolute value for a predetermined value output of said a-c tachometer independent of said first and second polarity signals.

13. A circuit apparatus in accordance with claim 11 wherein said signal processing paths of said absolute value circuit means includes a first and a second input signal path to an amplifier, said first signal path receiving the output of said a-c tachometer, said second signal path receiving a selectively developed signal having a polarity opposite to that of the output of said a-c tachometer, said selectively developed signal being selectively developed in response to the condition of said switch means in response to said polarity signal, means to algebraically sum the signals in said first and second input signal paths to produce a single polarity output signal for positive and negative half cycles of said a-c tachometer output for a predetermined polarity signal whereby the direction of rotation of said bi-directional machine may be indicated by the polarity of said single polarity signal and the speed of rotation of said bi-directional d-c machine indicated by the absolute value of said output signal.

14. A circuit apparatus for providing a signal indicative of speed and direction of rotation of a bi-directional d-c machine utilizing an a-c tachometer output as the speed signal from said bi-directional d-c machine, comprising:

circuit means for providing a signal proportional to the counter electromotive force generated in the armature, said circuit means including an amplifier having a non-inverting input, an inverting input and an output, said non-inverting input receiving a signal derived from armature voltage by circuit network means, said inverting input of said amplifier receiving a signal derived from armature current, the signal appearing on the output of said amplifier being the difference of the two input signals and being proportional to the counter electromotive force generated in the armature;

zero current detector means for detecting substantially zero armature current and producing a zero current detector output signal when armature current is substantially zero;

polarity circuit means for generating a polarity signal which is a function of the polarity of the counter electromotive force, said polarity circuit means including circuit means selectively operable to increase the sensitivity of the polarity circuit means, said sensitivity circuit means receiving the output signal proportional to the counter electromotive force and being responsive to the output of said zero current detector means, said sensitivity circuit means increasing sensitivity when said zero current detector means detects substantially zero armature current; and absolute value circuit means, said absolute value circuit means including a first amplifier provided with an input and an output and a second amplifier provided with an input and an output, a first and a second signal path for applying a signal to said input of said second amplifier, the output of said a-c tachometer driven by said bi-directional d-c machine being applied to said input of said first amplifier and to said input of said second amplifier via said first signal path, switch means responsive to said polarity signal and conncted to the output of said first amplifier for selecting a signal feedback path, a circuit component in one of the signal feedback paths for developing a signal to be applied to said second signal path of said input of said second amplifier, said first and second signals paths being comprised of predetermined relative component values, said signals in said first and second signal paths being algebraically summed at the input to said second amplifier to produce a net signal input to said second amplifier to produce the output of said absolute value circuit means on the output of said second amplifier whereby said output of said absolute value circuit means is proportional to the output of said a-c tachometer and the speed of said d-c machine and whereby the polarity of the output of said absolute value circuit means is a function of the direction of rotation of said d-c machine.

15. A circuit apparatus in accordance with claim 14 wherein said circuit network means includes a series connected resistor and capacitor; sid armature voltage being applied across said series combination of said resistor and capacitor, said non-inverting input receiving the signal developed across said capacitor.

16. A circuit apparatus in accordance with claim 14 wherein said switch means is comprised of:

two sets of two unidirectional current switch means;

one set of said two sets of two switch means being enabled in response to said polarity signal being of the first polarity with one of the two switch means of said set conducting on alternate half cycles of the a-c tachometer output, conduction through one of said enabled unidirectional current switch means of the enabled set of switch means developing a signal of a first predetermined polarity across said circuit component in the feedback path, said developed signal being fed to said input of said second amplifier via said second signal path; and said second set of two unidirectional current switch means being enabled when said polarity signal is of a second polarity with one of said two switch means of said second set conducting on alternate half cycles of the a-c tachometer output, current conduction through one of said two unidirectional current switch means of said second set of switch means developing a signal across said circuit component of a polarity opposite to the polarity developed by conduction through one of the unidirectional switch means of the first set, said developed signal being applied to said input of said second amplifier via said second signal path.

17. A circuit apparatus in accordance with claim 16 wherein said circuit component in the feedback path is a resistor.

* * * * *